Sept. 10, 1963 H. K. LIGOTKY 3,103,558

TONE DETECTOR

Filed Sept. 24, 1959 4 Sheets-Sheet 1

INVENTOR.
H. K. LIGOTKY
BY [signature]
ATTORNEY

Sept. 10, 1963 H. K. LIGOTKY 3,103,558

TONE DETECTOR

Filed Sept. 24, 1959 4 Sheets-Sheet 2

TONE RECEIVER-BLOCK DIAGRAM

SIGNAL SUPPRESSOR

Sept. 10, 1963 H. K. LIGOTKY 3,103,558

TONE DETECTOR

Filed Sept. 24, 1959 4 Sheets-Sheet 4

United States Patent Office 3,103,558

Patented Sept. 10, 1963

3,103,558

TONE DETECTOR

Harri Kurt Ligotky, Chicago, Ill., assignor to International Telephone & Telegraph Corporation, New York, N.Y., a corporation of Maryland Filed Sept. 24, 1959, Ser. No. 842,136
11 Claims. (Cl. 179—84)

This invention relates to tone detectors and more particularly to means for separating signals which lie in the same frequency spectrum.

Although harmonics of the human voice may include frequencies which are higher than 3000 cycles per second, it has been found that such higher frequencies may be eliminated without loss of intelligence. Therefore, in the past typical telephone equipment has been designed to limit voice channels to a bandwidth of about 0 to 3000 cycles per second. However, it is not enough merely to provide for the transmission of voice signals, it is also necessary to provide for transmitting control signals which may be used to establish and maintain connections through a telephone system. For example, it is necessary to transmit digit pulses, off-hook supervision, and the like. If an extra control channel is provided, there is a wasteful duplication of parts. If a bandwidth of more than 3000 cycles per second is provided for each audio channel, there is a needless waste of communication facilities. Therefore, it is customary to use control signals having frequencies which may be passed through the equipment that is also used to convey speech signals. The problem is to separate the speech and control signals so that each may properly perform its functions.

In the past, it has been common practice to separate voice and control signals according to the frequency thereof. That is, sharply tuned band-pass filters pick-out the frequencies used for control signals. Among other things, the disadvantages of such prior systems are that sharply tuned, band-pass filters are very expensive and that voice transmission is degraded by an elimination of the band of frequencies which are utilized to transmit control signals. An attempt to improve the quality of voice transmission by reducing the bandwidth of the signal channel results in higher cost filters. If an effort is made to reduce the cost of the filters, a broader band must be used for the transmission of control signals, thereby further degrading the voice signals. Moreover, means must be provided to accommodate a wide fluctuation of signal strength between the tone components of compound-tone control signals, the length of control signal pulses may vary from a desired standard, and occasionally the voice frequencies may exactly simulate control signals.

An object of this invention is to provide new and improved means for separating two types of signals which lie in the same acoustic spectrum.

Another object of this invention is to provide means for separating different types of signals without requiring expensive, sharply tuned, band-pass filters.

Yet another object of this invention is to provide means for separating voice and control signals, wherein signal strength may fluctuate over a wide range.

Still another object of this invention is to provide means for detecting individual tone components which may have a wide variance of signal strength.

A further object of this invention is to provide a tone detector having immunity to voice signals.

This invention provides means for separating voice and control signals which fall within a single acoustic spectrum. The separation is accomplished through the interaction of an amplifier used as a signal suppressor and a constant output amplifier which cooperate to change the relative strength of voice and control signals. That is, each voice channel or transmission medium conveys electrical signals representing a single band which includes both voice and control signals. A sample of all such electrical signals is bled-off and fed through a signal suppressor which distorts the signal by greatly amplifying an exclusively voice signal portion of the band but which does not affect the control portion of the band. The distorted signal is then fed through a constant output amplifier, i.e. an amplifier with automatic gain control. Therefore, if present, the broad band of greatly amplified voice signals swamps succeeding equipment and the narrow band of unamplified control signals is too weak to have any practical effect. On the other hand, if broad band voice signals are not present, there is little effect in the signal suppressor; substantially the entire output of the constant output amplifier consists of the narrow band of control signals, and succeeding equipment responds thereto.

The above mentioned and other objects of this invention together with the manner of obtaining them will become more apparent and the invention itself will be best understood by making reference to the following description of the invention taken in conjunction with the accompanying drawings in which.

Where possible, simple terms are used and specific items are described hereinafter to facilitate an understanding of the invention; however, it should be understood that the use of such terms and references to such items are not to act in any manner as a disclaimer of the full range of equivalents which are normally given under established rules of patent law. For example, hereinafter the specification refers to detection of control signals which are transmitted as tones that are included in the acoustical spectrum of the human voice; whereas, the invention has utility any time that signals in the same spectrum are to be separated. Moreover, the drawings show transistorized circuits; whereas, electron tubes or other suitable components may be used. In addition, the drawings show specific details of amplifier circuits; whereas, any suitable amplifier and filter combinations may be used. Quite obviously, other examples could be selected to illustrate the manner in which the terms that have been used and the items which have been described are entitled to a wide range of equivalents.

*Brief Description*

Figure 1A:
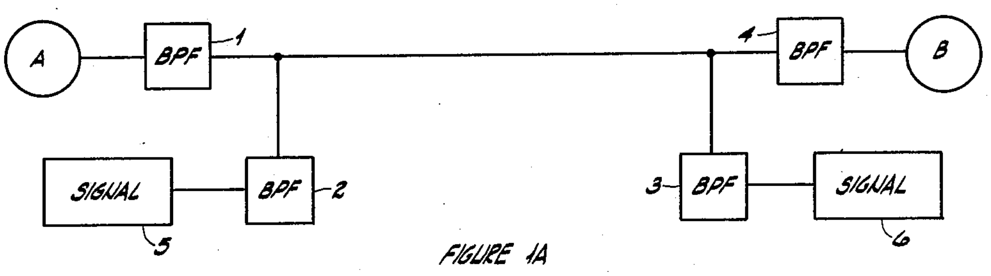
FIG. 1A shows prior art.

In typical prior art systems, signal separation is accomplished by means of circuits which are illustrated in FIG. 1A. When subscribers talk over a telephone system, the voice signals comprise a continuous spectrum of frequencies having characteristics as shown in FIG.

1B. Band-pass filters 1 and 4 are adapted to "notch" the voice signals by eliminating a narrow band at about 1000 cycles, for example (FIG. 1C), thereby creating a discontinuous spectrum of frequencies. Thereafter, any suitable signalling equipment 5 and 6 provides control signals of about 1000 cycles which are passed by band-pass filters 2 and 3. The control signals fall within the notch provided by band-pass filters 1 and 4 as indicated by the dotted-line curve in FIG. 1C. The troubles with this system are: first, the notch in the voice frequency spectrum which is produced by filters 1 and 4 causes a degrading of the voice signal, and second, the signal frequencies and voice frequencies tend to overlap, thus requiring expensive band-pass filters which have sharp cut-off characteristics.

Figure 1B:
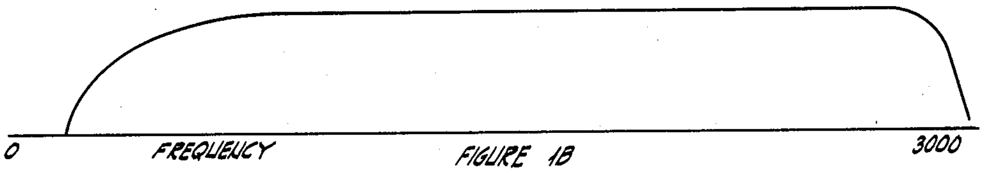
FIG. 1B shows a characteristic spectrum of a telephone transmitter and of voice transmission in the subject invention.
Figure 1C:
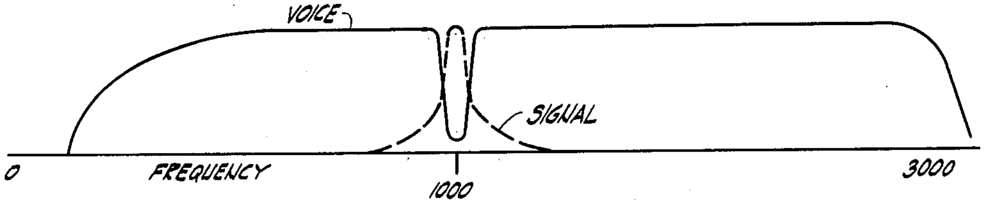
FIG. 1C shows a characteristic spectrum of prior art voice and control signals.
Figure 1D:
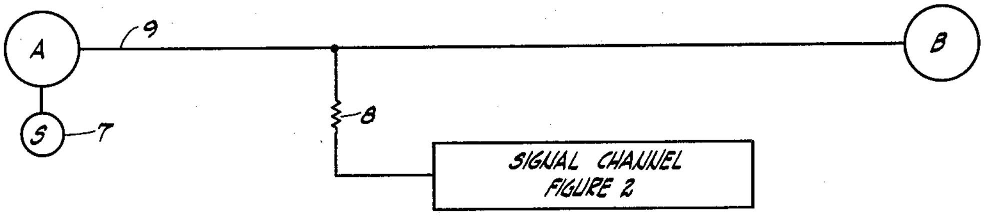
FIG. 1D shows how the subject invention connects into a voice channel.

FIG. 1D illustrates the manner in which the subject invention provides for signalling. A subscriber at station A has a signal sending device 7 which applies voice frequency tones to the line in the same manner that voice signals are applied. Therefore, the signals transmitted over line 9 include both voice and control frequencies shown in FIG. 1B. The voice spectrum is continuous; there is no degrading notch as shown in FIG. 1C. Although the voice transmission is unimpaired, there is a problem of detecting control signals while maintaining immunity to random or spurious frequencies in the voice signal.

The subject invention samples or bleeds-off, through a limiting resistance 8, a sample of all signals passing between subscribers A and B via channel 9. The sample or bled-off signal is then fed into a signal channel (FIG. 2) where an analysis is made of the content thereof. If a broad band of frequencies is present, it indicates that subscribers A and B are conversing; therefore, frequencies that are used as control signals are minimized so that the signalling equipment may not be influenced thereby. On the other hand, if there is no broad band of voice frequencies, the frequencies that are used as control signals are maximized whereby the signalling equipment of FIG. 2 may be actuated. Thus, the system of FIG. 1D separates the voice and control channels by, in effect, continuously analyzing a sample signal diverted through resistance 8 to detect the presence of a wide band of voice signals. Preference is given to the wide band of voice signals if present and preference is given to the narrow band of control signals if the voice signals are not present.

*Detailed Description*

Figure 2:
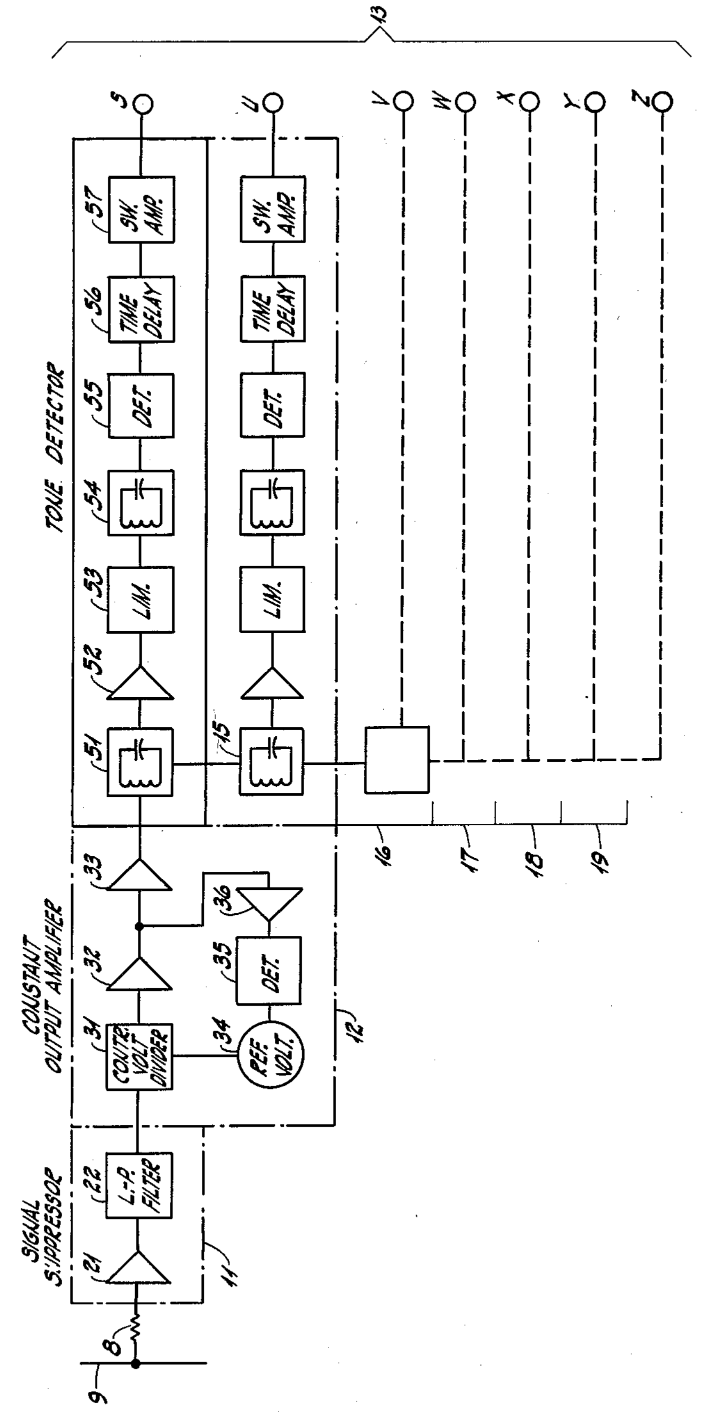
FIG. 2 illustrates a tone receiver by means of a block diagram.

Referring to FIG. 2, both voice and control signals are transmitted over channel 9. A sample of all such signals is diverted or bled-off through limiting resistance 8 and applied to suppressor 11 which is adapted to distort the signals by amplifying a broad band of frequencies that do not fall within the range which is used for transmitting control signals. Item 12 is an amplifier having an output signal which is constant despite a wide range of variations which may occur in the input signal. Item 13 comprises a plurality of tone detection channels, each being tuned to an individual frequency identified by the letters S, U, V, W, X, Y and Z. Control data is transmitted over channel 9 by signals consisting of one or more of the enumerated frequencies, e.g. the "S" frequency may be a seizure signal, frequencies "V" and "W" may represent the numeral 1, frequencies "X" and "W" may represent the numeral 2, etc. Each of the channels 16–19 is provided with all of the components shown in the "S" and "U" channels except that networks similar to 51 and 54 are tuned to different frequencies.

Figure 3A:
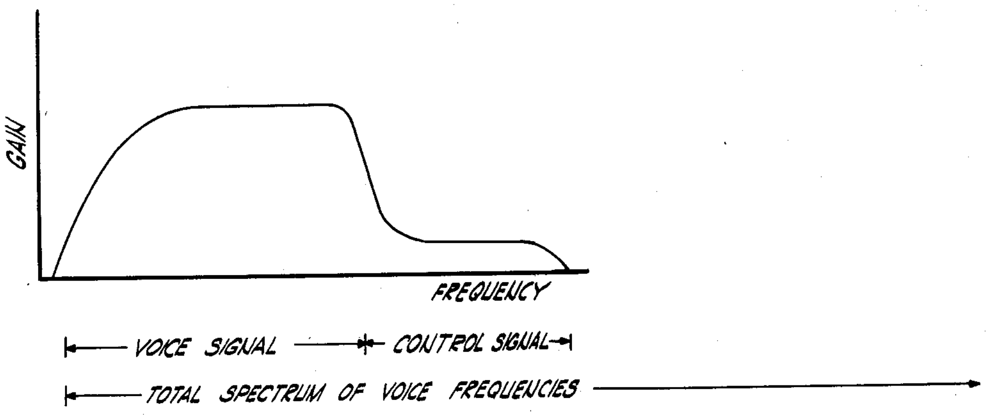
FIG. 3A illustrates the characteristics of the suppressor.

Means is provided for improving voice immunity by changing the amplitude distribution of incoming voice frequency signals. More particularly, signal suppressor 11 (having characteristics as shown in FIG. 3A) comprises an amplifier 21 and a low pass filter 22 which cooperate to amplify voice frequencies that are lower than the control signal band. The amplification of suppressor 11 is relatively high in the range—marked "Voice Signal" (FIG. 3A)—having a frequency which is lower than control signals and the amplification is relatively low in the range of control signals.

Figure 3B:
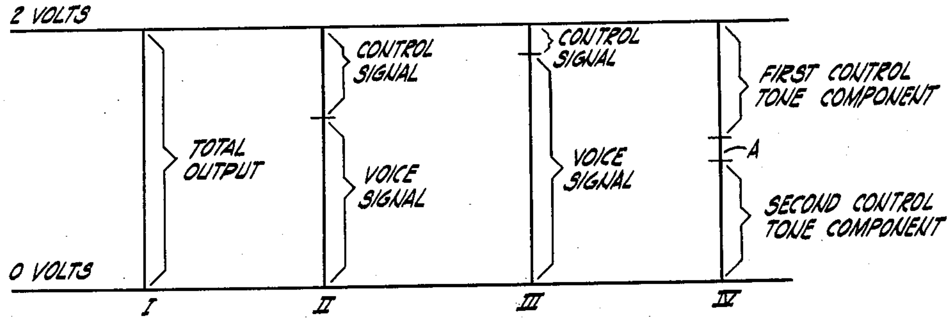
FIG. 3B illustrates how suppressor 11 and amplifier 12 cooperate to distort the signal.

Reference may be had to FIG. 3B for a graphical illustration of the manner in which signal suppressor 11 and constant output amplifier 12 cooperate to eliminate control signals during periods when a voice signal is on line 9. In FIG. 3B, the space between the lower line marked "0 Volts" and the upper line marked "2 Volts" represents the total output of amplifier 12. Quite obviously, these values are selected merely for purposes of illustration—any suitable signal values may be used. Curve I (FIG. 3B) indicates graphically the total output of amplifier 12 under all conditions. Curve II indicates the content of the output signal from amplifier 12 which would occur when frequencies in both the voice and control range are present, if suppressor 11 were not provided. For example, during telephone conversations, voice currents may include frequencies which fall within the portion of the acoustic spectrum that is used for transmitting control signals, i.e. the upper portion of curve II. The remainder of the voice signal is indicated by the lower portion of curve II. Since suppressor 11 is present and further since the total output of amplifier 12 does not change, the original signals (curve II) are distorted as shown by curve III. That is, a broad band of voice signals is amplified so that it occupies a larger portion of the output signal of amplifier 12 thereby reducing the relating signal strength of the control frequencies. The conversing subscribers are not aware of any distortion in their voice signals since the sounds which they hear result from signals that are transmitted over channel 9 and are not effected by anything which happens in suppressor 11. Insofar as the tone detectors of FIG. 2 are concerned, the distortion caused by suppressor 11 is not objectionable since the object is either to minimize or to maximize control signals depending upon the presence or absence of voice signals and further since suppressor 11 has a flat response in the control signal range.

During periods when control signals are to be effective, there is no voice signal on line 9. Signal suppressor 11 provides little or no amplification. The total content of the input signal applied to amplifier 12 comprises tone components which are used for signalling purposes. Since the output of amplifier 12 does not change responsive to the fluctuations in the input signal, the total output of amplifier 12 consists of tone components which are used for control purposes together with any noise which may occur. Curve IV (FIG. 3B) illustrates the output of amplifier 12 when only two tone components—together with noise "A"—are present. Tone detectors 13 are adapted to respond to control signals having a strength as indicated by curve IV but not to respond to control signals having a strength as indicated by curve III.

Figure 4:
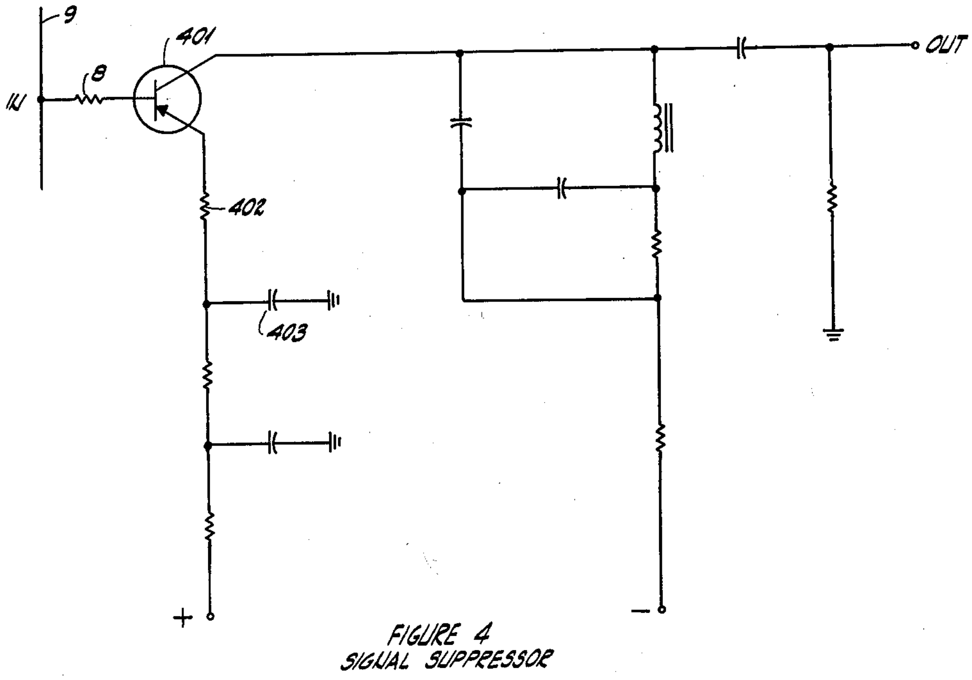
FIG. 4 shows the circuitry of suppressor 11.

Next reference is made to the amplifier of FIG. 4 which is used as suppressor 11 in FIG. 2. While any suitable electrical values may be accommodated, it has been found that signalling may be accomplished in a typical telephone system when all signals above 1.3 kc. are suppressed by about 7 db. Thus, the random frequencies falling in the control band which occur during ordinary speech are suppressed by about 7 db and the signal to noise ratio is decreased by about 1.5 db due to the gain which is introduced by the amplifier for frequencies of less than 1 kc. The amplifier response is substantially flat in the control signal band. These characteristics result from the circuitry of FIG. 4 wherein resistance 8 limits the signal which is sampled or bled-off voice channel 9. The emitter circuit determines the slope of the output characteristics at low frequencies and the collector circuit provides a low pass filter which shapes the amplifier's output characteristics at higher frequencies as shown in FIG. 3A.

Figure 6:
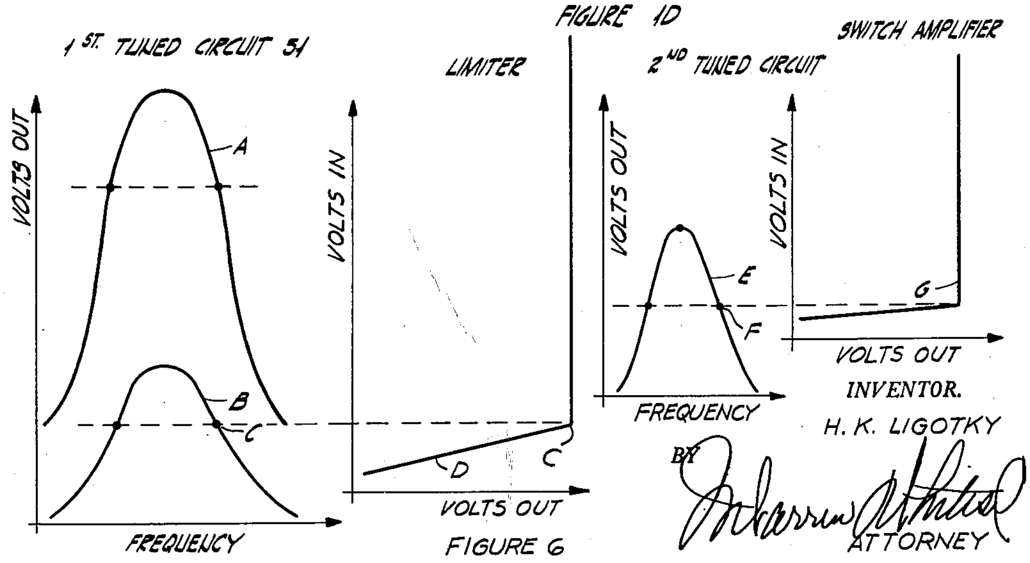
FIG. 6 illustrates the characteristics of the various items which are shown in FIG. 5.
Figure 5:
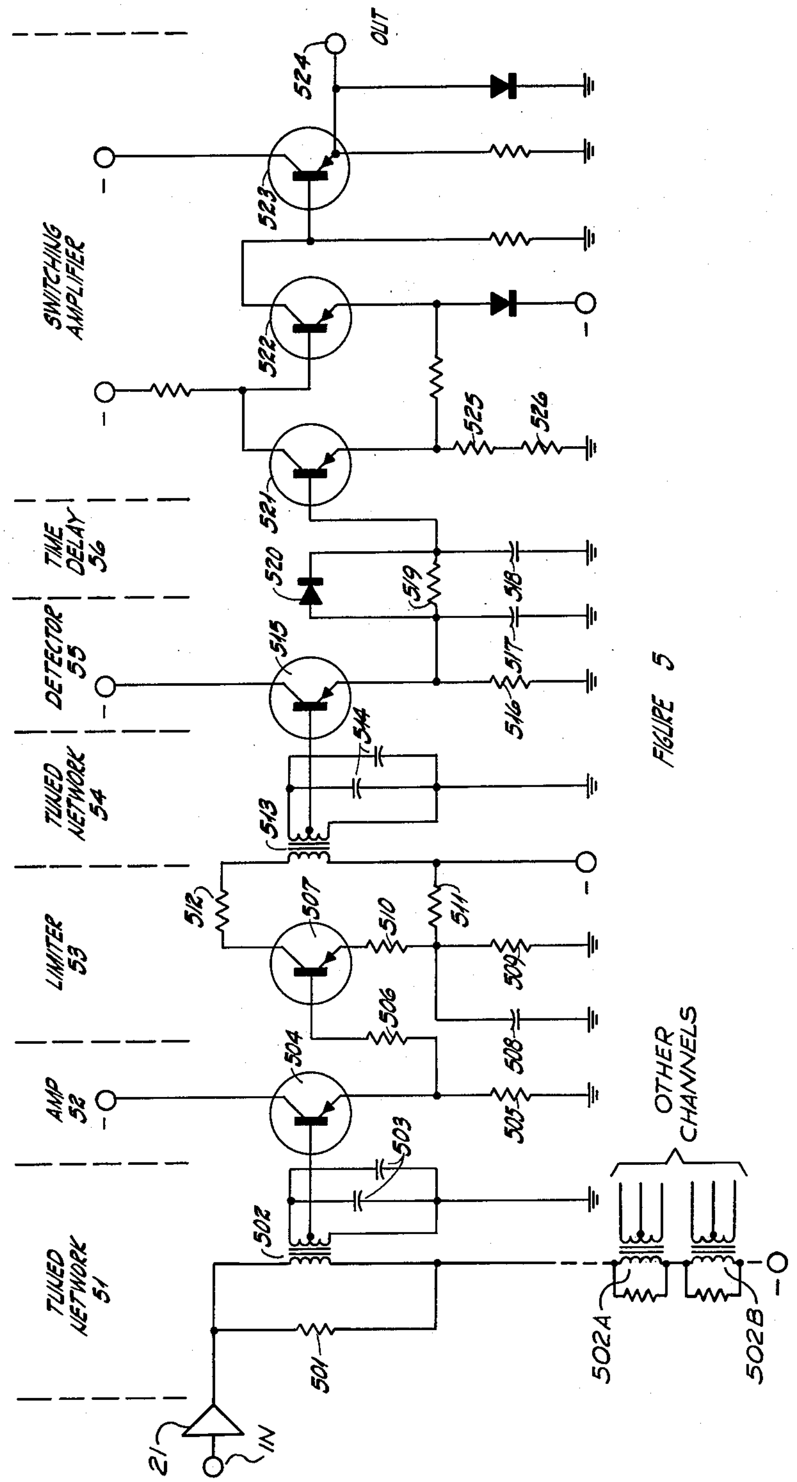
FIG. 5 shows circuit details of one channel of the tone detector.

FIG. 5 illustrates the circuitry which is used to complete the hollow boxes shown in the tone detector for frequency "S" (FIG. 2) and which is duplicated in each of the other tone detector channels. Item 51 is a tuned network which is adapted to pass frequencies having characteristics as shown in FIG. 6. The output of tuned network 51 may fall any place between curve A and curve B (FIG. 6) due to the possible variations of a compound signal tone, i.e. there may be (1) no noise on line 9 and both tone components may have equal amplitude, and (2) noise on line 9 and the two tone components may have unequal amplitude. Since the detector channel must respond to the minimum voltage at which control signals may occur, the circuit must be arranged to respond to signals having a minimum voltage which is indicated by point C. While curve B has the proper bandwidth at the voltage that is indicated by the letter C, curve A has a much broader bandwidth at the voltage of point C. Therefore, a limited bandwidth of control frequencies is selected by alternate tuned networks and limiter stages.

Signals from constant output amplifier 12 (FIG. 2) are applied to the terminal marked "IN" (FIG. 5). As indicated in FIG. 5, a transformer such as item 502 is provided for each signal channel, for example, transformer 502A may be in channel 18 and transformer 502B may be in channel 19 with other transformers (not shown) provided for each additional channel. The primary winding of each transformer is connected in series and driven by a common amplifier 21. The secondary winding of each transformer is connected to individual channel equipment. Resistances such as 501 and capacitances such as 503 cooperate to tune each channel to the desired frequency and further to provide a bandwidth which is less than the frequency difference between adjacent channels, thereby preventing any subharmonic from passing the following limiter.

The output of tuned transformer 502 is applied to transistorized half-wave amplifier 504 which prevents loading of tuned circuit 51. Resistance 505 is provided to control the input impedance of emitter follower 504. Resistance 506 tends to keep the load reflected from the limiter of amplifier 504 constant even at higher voltages.

Amplifier 507 limits the signal as shown by curve D (FIG. 6) to the voltage of point C, i.e. limiter 507 provides an output signal having constant strength regardless of whether tuned circuit 51 passes signals at levels indicated by curve A (FIG. 6) or by curve B or at some intermediate point above level C in curve B. Capacitance 508 is a decoupling device which passes A.C. signals to ground. Resistances 509 and 511 provide a voltage divider which determines the emitter bias of limiter 507. Resistance 510 stabilizes the gain of transistor 507, i.e. the sensitivity of the limiter. Resistance 512 lowers the collector voltage to provide a better limiting action.

Items 513 and 514 constitute a tuned circuit which has output characteristics as shown by curve E in FIG. 6. Since the originally applied input signal has been limited as shown by curve D, tuned circuit 54 passes only the required bandwidth at voltages indicated by point F, thereby eliminating the problems created by widely fluctuating signal strength as indicated by curves A and B.

Detector 55 is in effect, a rectifier having a high input impedance and a low output impedance providing a D.C. output voltage which is proportional to the A.C. voltage across tuned circuit 54. Resistor 516 limits the current and capacitor 517 acts as charging capacitor.

Capacitor 518, resistance 519 and diode 520 provide a time delay circuit having relatively long charge but short discharge time which is adapted to limit the response of the tone detector to signals having at least a predetermined duration. In this manner, momentary voice signals falling in the control band may not trip the tone detector. In greater detail, the output of transistor 515 is fed through resistance 519 to charge capacitance 518 over an extended period of time. Diode 520 is poled so that it does not pass charging current. After capacitor 518 has charged sufficiently, transistor 521 begins to conduct. The discharge of capacitor 518 is very quick since diode 520 is poled to provide a low resistance circuit to pass discharging current through resistance 516 to ground. This is very important because it prevents charging of capacitor 518 from short signal frequency pulses contained in speech which might otherwise accumulate over a period of time. Transistors 521 and 522 act as pulse amplifiers with a characteristic as shown by curve G (FIG. 6). Transistor 523 is a power output stage. The output signal at terminal 524 may be fed into logic circuitry to provide any suitable control function. Resistance 526 is sensitive to temperature variations, thereby automatically adjusting the gain of transistor 521 to compensate for any temperature variations in the detector channel.

While the principles of the invention have been described above in connection with specific apparatus, it is to be clearly understood that this description is made only by way of example and not as a limitation to the scope of the invention.

I claim:

1. A communication channel comprising means for transmitting a continuous spectrum of frequencies falling within a predetermined bandwidth, means for transmitting control signals having a limited bandwith of frequencies which falls within said predetermined bandwidth, means for sampling signals transmitted over said channel, means for analyzing said sample to detect the presence of a wide band of signals, said analyzing means comprising a first amplifier coupled to amplify at least a portion of said wide band of signals and to have substantially no amplifying effect on said limited band, a constant output amplifier coupled to amplify the output of the said first amplifier, means including said constant output amplifier and rendered effective responsive to said amplification of said portion of said wide band of signals for rendering said control signals ineffective, and means including said constant output amplifier and rendered effective responsive to an absence of said amplified portion of said wide band of signals for rendering said control signals effective.

2. The channel of claim 1 and means including alternate tuned circuits and limiting circuits for selecting said limited bandwidth, means for detecting signals in said selected band, means for measuring a predetermined period of time following said detection of said selected signals, and means effective at the end of said predetermined time period for causing a circuit response if said detected signal continues.

3. The detector of claim 2 wherein said means for measuring a predetermined period of time comprises means including a capacitor having a relatively long charging time, and a relatively short discharging time.

4. A signal separation system comprising means for conveying a particular spectrum of signals including a plurality of different types of signals falling within said spectrum, means for separating said signals according to said types, said separating means comprising means for distorting the amplitude distribution of said signals to decrease the relative strength of one type of said signals in the presence of another type of said signals, and to increase the relative strength of said one type of said signals in the absence of said other type of said signals wherein said distorting means comprises a combination of a first amplifier tuned to amplify only said other type of said signals, a second amplifier coupled thereto to provide an output signal of constant signal strength regardless of any fluctuations of input signal strength, whereby substantially the total output of said second amplifier comprises said other type of signals when present and comprises said one type of signals when said other type of signals are not present, means for responding to said one type of said signals when distorted to have relatively high signal strength, and means for rejecting said one type of said signals when distorted to have a relatively weak signal strength.

5. A signal separation system comprising means for conveying a particular spectrum of signals including a plurality of different types of signals falling within said spectrum, means for separating said signals according to said types, said separating means comprising means for distorting the amplitude distribution of said signals to decrease the relative strength of one type of said signals in the presence of another type of said signals and to increase the relative strength of said one type of said signals in the absence of said other type of said signals, wherein said one type of said signals comprises frequencies transmitted in a relatively narrow bandwidth, said other type of said signals comprises frequencies transmitted in a relatively wide bandwidth, said narrow bandwidth falling within said wide bandwidth, said distorting means comprises an amplifier having characteristics such that at least a portion of said wide band is amplified greatly compared to the said narrow band, means for responding to said one type of said signals when distorted to have relatively high signal strength, and means for rejecting said one type of said signals when distorted to have a relatively weak signal strength.

6. The system of claim 5 and means comprising a constant output amplifier couplied to receive and amplify the output of said distortion producing amplifier whereby substantially all of the signal of said constant output amplifier comprises said wide band of signals when present and said narrow band of signals when said wide band of signals is not present.

7. In the system of claim 5 tone detector means comprising means including a plurality of circuits for passing frequencies falling in said narrow bandwidth, said circuits being alternately tuned circuits and limiting circuits, means for detecting signals passed through said alternately tuned and limiting circuits, means for measuring a predetermined period of time following said detection of said signals, and means effective at the end of said measured time period for causing a response if said passed signals are still present.

8. A telephone system comprising a voice channel, means for transmitting a continuous spectrum of voice current signals through said channel, means for transmitting through said channel a relatively narrow bandwidth of control signals falling within said spectrum, means for separating said voice signals and said control signals comprising means for continuously sampling the current being transmitted through said channel, means for amplifying all voice current signals in said sample having a frequency which is less than said narrow band, means coupled to said last named means for maintaining a constant signal strength regardless of fluctuations in the output signal of said last named means, means comprising a network tuned to pass said narrow bandwidth connected to said constant signal means, means coupled to said tuned network for limiting the signal strength of current passed through said tuned network, and means comprising a second network tuned to pass said narrow bandwidth connected to transmit the signals passed through said limiting means.

9. The system of claim 8 and detector means for rectifying signals passed through said second tuned network, and filter means connected to said detector means to provide a relatively smooth direct current responsive to said rectified signals.

10. The system of claim 9 and means comprising a resistance and capacitance for measuring a predetermined period of time during which said capacitance charges responsive to flow of said relatively smooth direct current, and means comprising a diode coupled across said resistance and poled to provide a very fast discharge time constant for said capacitance.

11. The system of claim 10 and means coupled to transmit an effective output signal after a period of time measured by said charging of said capacitance if said direct current continues.

References Cited in the file of this patent

UNITED STATES PATENTS

| | | |
|---|---|---|
| 2,364,685 | Baker | Dec. 12, 1944 |
| 2,577,614 | Fritschi et al. | Dec. 4, 1951 |
| 2,698,878 | Martens | Jan. 4, 1955 |
| 2,806,903 | Hargreaves | Sept. 17, 1957 |
| 2,830,128 | Radcliff et al. | Apr. 8, 1958 |
| 2,883,474 | Fritschi | Apr. 21, 1959 |
| 2,929,880 | Koehler | Mar. 22, 1960 |
| 2,935,572 | Hastings et al. | May 3, 1960 |
| 2,964,650 | Radcliff et al. | Dec. 13, 1960 |